(12) United States Patent
Staples et al.

(10) Patent No.: US 11,443,039 B2
(45) Date of Patent: Sep. 13, 2022

(54) CONTROLLER COMPUTING SYSTEM FOR PREVENTING MALICIOUS CONTROL OF A CONTROLLED MACHINERY SYSTEM

(71) Applicant: Fathom5 Corporation, Austin, TX (US)

(72) Inventors: Zachary Hayden Staples, Kyle, TX (US); David Alexander Burke, Pflugerville, TX (US); Jeffrey Ryan Latham, Spicewood, TX (US)

(73) Assignee: FATHOM5 CORPORATION, Austin, TX (US)

( * ) Notice: Subject to any disclaimer, the term of this patent is extended or adjusted under 35 U.S.C. 154(b) by 153 days.

(21) Appl. No.: 16/999,390

(22) Filed: Aug. 21, 2020

(65) Prior Publication Data

US 2022/0058265 A1 Feb. 24, 2022

(51) Int. Cl.
*G06F 21/56* (2013.01)
*H03K 19/003* (2006.01)

(52) U.S. Cl.
CPC .......... *G06F 21/566* (2013.01); *G06F 21/567* (2013.01); *H03K 19/003* (2013.01); *G06F 2221/034* (2013.01)

(58) Field of Classification Search
CPC ................. G06F 21/566; G06F 21/567; G06F 2221/034; H03K 19/003
See application file for complete search history.

(56) References Cited

U.S. PATENT DOCUMENTS

| | | | |
|---|---|---|---|
| 9,756,062 B2 * | 9/2017 | Dekel | G06F 21/554 |
| 9,836,512 B1 * | 12/2017 | Singh | H04L 63/1433 |
| 10,015,188 B2 | 7/2018 | Schneider et al. | |
| 10,027,699 B2 | 7/2018 | Wei et al. | |
| 10,044,749 B2 | 8/2018 | Canedo et al. | |
| 10,104,098 B2 * | 10/2018 | Baxley | H04B 1/0064 |
| 10,218,741 B2 * | 2/2019 | Gopalakrishna | H04L 63/145 |
| 10,257,179 B1 * | 4/2019 | Saylor | H04W 12/068 |
| 10,896,261 B2 * | 1/2021 | Rieger | G06F 21/577 |
| 2018/0096153 A1 | 4/2018 | DeWitte et al. | |
| 2019/0220374 A1 | 7/2019 | Wei et al. | |
| 2019/0297095 A1 | 9/2019 | Formby et al. | |
| 2019/0317465 A1 | 10/2019 | Wei et al. | |
| 2020/0050167 A1 | 2/2020 | Canedo et al. | |

FOREIGN PATENT DOCUMENTS

| | | |
|---|---|---|
| CN | 110320890 A | 10/2019 |
| WO | 2019066883 A1 | 4/2019 |

\* cited by examiner

*Primary Examiner* — Hosuk Song
(74) *Attorney, Agent, or Firm* — Baker Botts L.L.P.

(57) ABSTRACT

A controller computing system, including a plurality of controllers, each controller configured to i) calculate a respective output based on a current set point and ii) output a timer signal; a cyber security manager (CSM) computing module configured to: output a nominal signal indicating that the current set point is a non-malicious set point when the CSM computing module receives each of the timer signals from each of the plurality of controllers; and output a reset signal indicating that the current set point is a malicious set point when the CSM computing module receives less than each of the timer signals from the plurality of controllers.

19 Claims, 8 Drawing Sheets

CONTROLLER COMPUTING SYSTEM FOR PREVENTING MALICIOUS CONTROL OF A CONTROLLED MACHINERY SYSTEM

BACKGROUND

Field of the Disclosure

The disclosure relates generally to a controller computing system for preventing malicious control of a system.

Description of the Related Art

It has been shown that controllers (e.g., machinery controllers) running similar firmware can be exploited to adversely impact an automated process of a system (e.g., a machinery system). For example, a cyberattack can exploit a common vulnerability across multiple controllers. This demonstrates the challenge of operating a reliable system when a component of the system is malfunctional ("traitor") to other components that remain "loyal" to the original purpose of the system.

SUMMARY

Innovative aspects of the subject matter described in this specification may be embodied in a system including a first controller configured to i) calculate a first output based on a current set point and ii) output a first timer signal; a second controller configured to i) calculate a second output based on the current set point and ii) output a second timer signal; a third controller configured to i) calculate a third output based on the current set point and ii) output a third timer signal; a fourth controller configured to i) calculate a fourth output based on a previous set point and ii) output a fourth timer signal; an enhanced time delay buffer configured to delay reception of the current set point by the fourth controller; a cyber security manager (CSM) computing module configured to: when each of the first timer signal, the second timer signal, and the third timer signal are received, output a nominal signal; and when two or less of the first timer signal, the second timer signal, and the third timer signal are received, output a reset signal; an enhanced voter computing module configured to: when the nominal signal is received from the CSM computing module, i) identify a majority based on the first output, the second output, and the third output, and ii) generate a voter output based on the identified majority; and when the reset signal is received from the CSM computing module, generate the voter output based on the fourth output.

Other embodiments of these aspects include corresponding methods, apparatus, and computer programs, configured to perform the actions of the methods, encoded on computer storage devices.

These and other embodiments may each optionally include one or more of the following features. For instance, the CSM computing module is further configured to, when two or less of the first timer signal, the second timer signal, and the third timer signal are received, output an out of band signal, wherein the enhanced time delay buffer is further configured to receive the out of band signal, and in response, drop a time delay of the fourth controller such that the fourth controller outputs the fourth output to the enhanced voter computing module. Each of the first controller, the second controller, and the third controller are further configured to receive the out of band signal, and in response, restart one or more of the first controller, the second controller, and the third controller. When the CSM computing module receives only the first and the second timer signal, the CSM computing module is configured to output the out of band signal to command the third controller to restart. When the CSM computing module receives only the first timer signal, the CSM computing module is configured to output the out of band signal to command the first controller to restart. The fourth controller stores the fourth output in a queue, and provides the fourth output in response to the drop time delay signal from the enhanced time delay buffer. The first controller includes a first memory diversification, the second controller includes a second memory diversification, the third controller includes a third memory diversification, and the fourth controller includes a fourth memory diversification, wherein each of the first memory diversification, the second memory diversification, the third memory diversification, and the fourth memory diversification are different. When the CSM computing module outputs the nominal signal, the first output, the second output, and the third output are all substantially the same. The first controller generates the first timer signal i) in response to generating the first output and ii) within a time threshold.

Innovative aspects of the subject matter described in this specification may be embodied in a system including a plurality of controllers, each controller configured to i) calculate a respective output based on a current set point and ii) output a timer signal; a cyber security manager (CSM) computing module configured to: output a nominal signal indicating that the current set point is a non-malicious set point when the CSM computing module receives each of the timer signals from each of the plurality of controllers; and output a reset signal indicating that the current set point is a malicious set point when the CSM computing module receives less than each of the timer signals from the plurality of controllers.

Other embodiments of these aspects include corresponding method, apparatus, and computer programs, configured to perform the actions of the methods, encoded on computer storage devices.

These and other embodiments may each optionally include one or more of the following features. For instance, the CSM computing module is further configured to, when each of the timer signals is not received from each of the plurality of controllers, output an out of band signal. Each of the plurality of controllers are further configured to receive the out of band signal, and in response, restart one or more of each of the plurality of controllers. A memory diversification of each of the plurality of controllers is substantially different.

Innovative aspects of the subject matter described in this specification may be embodied in a system including a first controller configured to calculate a first output based on a current set point; a second controller configured to calculate a second output based on the current set point; a third controller configured to calculate a third output based on the current set point; a fourth controller configured to calculate a fourth output based on a previous set point; an enhanced time delay buffer configured to delay reception of the current set point by the fourth controller; an enhanced voter computing module configured to: when a nominal set point is detected i) identify a majority based on the first output, the second output, and the third output, and ii) generate a voter output based on the identified majority; and when a malicious set point is detected, generate the voter output based on the fourth output.

Other embodiments of these aspects include corresponding method, apparatus, and computer programs, configured to perform the actions of the methods, encoded on computer storage devices.

These and other embodiments may each optionally include one or more of the following features. For instance, the enhanced time delay buffer further configured to receive an out of band signal and in response, drop a time delay of the fourth controller such that the fourth controller outputs the fourth output to the enhanced voter computing module. Each of the first controller, the second controller, and the third controller are further configured to receive the out of band signal, and in response, restart one or more of the first controller, the second controller, and the third controller. The fourth controller stores the fourth output in a queue, and provides the fourth output in response to the drop time delay signal from the enhanced time delay buffer. The first controller includes a first memory diversification, the second controller includes a second memory diversification, the third controller includes a third memory diversification, and the fourth controller includes a fourth memory diversification, wherein each of the first memory diversification, the second memory diversification, the third memory diversification, and the fourth memory diversification are different. The first output, the second output, and the third output are all substantially the same.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

This disclosure discusses systems and methods for preventing compromise of controllers of a controller computing system by a malicious party. Specifically, the controller computing system can control a system. For example, the system can be a mechanical system (e.g., a turbine system, or a coolant pump system); an electrical system, or a computing system (e.g., any system with inertia, thermo-continuity, fluid flow, or electrical current). In general, the controller computing system controls operation of the system. The controller computing system can receive a set point. In general, the set point indicates a particular operating parameter of the system. For example, if a controlled mechanical system were a rotating piece of equipment such as a motor or a turbine, the set point might include a suitable intended rotational speed for the equipment. The controller computing system can process the set point, and provide a control signal to the machinery system based on the set point to control the machinery system. The controller computing system can include multiple controllers operating in a parallel fashion to facilitate such control. In general, an enhanced voter computing module of the controller computing system can identify a majority among set point outputs from the controllers, and generate the control signal for the machinery system based on the identified majority. The controller computing system can include one of the controllers as a sheltered controller (i.e., the sheltered controller is time delayed in receiving the set point).

A malicious entity can attempt to gain control of the controlling system in order to maliciously control the machinery system. The controller computing system can intercept such malicious attempt (e.g., an attempt by an outside actor to create and communicate to a controlled system a malicious set point), causing the system to reset while maintaining control of the machinery system (e.g., based on a previous set point). As will be described in detail herein, the controllers of the controller computing system can each include memory diversification such that at most one controller is subjected to being controlled by the malicious entity. Because of the memory diversification, the remaining controllers, when attacked with malicious software, can fail to generate an output in response to the malicious set point, as well as fail to generate a timer signal (within a time threshold) as a result of the memory diversifications of the controllers. In general, a cyber security management computing module of the controller computing system can determine that one or more of the controllers fails to generate a respective timer output, and can notify the enhanced voter computing module to rely only on the output from the sheltered controller based on a previous non-malicious set point (as this sheltered controller is sheltered by the time delay from the malicious set point). The cyber security management computing module can further reset each of the controllers to purge any data associated with the malicious set point, and reset the executable programing code of each of the controllers.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Figure 1:
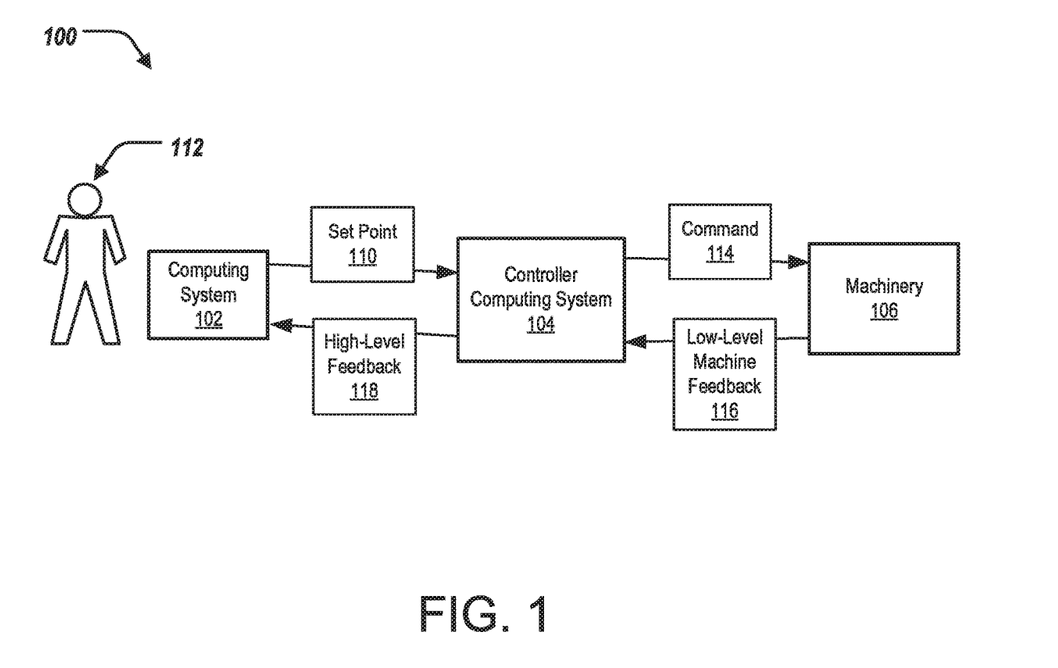
FIG. 1 is a high-level block diagram of a computing environment including an uncompromised controller computing system.

FIG. 1 illustrates a block diagram of a computing environment 100 when the computing environment 100 is operating under "normal" operating conditions, described further herein. In general, "normal" operating conditions are meant to describe the operation of a system before an attack by a malicious entity in an attempt to take over operation of the system for nefarious purposes such as damage or destruction of the system. The computing environment 100 can include a computing system 102, a controller computing system 104, and machinery 106. The computing system 102 can be in communication with the controller computing system 104; and the controller computing system 104 can further be in communication with the machinery 106.

In short, the controller computing system 104 can receive a set point 110 from the computing system 102. The set point 110 can be generated at the computing system 102, e.g., in response to user input from a user 112 interacting with the computing system 102. The set point 110 can be provided by the user 112 for controlling the machinery 106. For example, when the machinery 106 includes a turbine-based system, the set point 110 can include data that specifies and is used to cause a controlled system to operate at a specific revolutions per minute (RPM) for the turbine-based system. In another example, when the machinery 106 includes a coolant pump, the set point 110 can include a flow rate of coolant at the coolant pump.

The controller computing system 104 can process the set point 110, as described further herein, to generate a command 114. The controller computing system 104 can provide the command 114 to the machinery 106 to control/adjust one or more parameters of the machinery 106. For example, when the machinery 106 includes a turbine-based system, the command 114 can be a command to adjust the RPM of the turbine-based system based on the set point 110. For example, when the machinery 106 includes a coolant pump, the command 114 can be a command to adjust the flow rate of coolant at the coolant pump based on the set point 110.

The machinery 106 can receive the command 114 and adjust the parameters thereof in view of the command 114. For example, when the machinery 106 includes a turbine-based system, the machinery 106 can adjust the RPM of the turbine-based system in view of the command 114. For example, when the machinery 106 includes a coolant pump, the machinery 106 can adjust the flow rate of coolant at the coolant pump in view of the command 114.

After adjusting the parameters at the machinery 106 in view of the command 114, the machinery 106 can provide low-level machine feedback 116 to the controller computing system 104. The low-level machine feedback 116 can include feedback of the machinery 106 in response to the command 114. For example, when the machinery 106 includes a turbine-based system, the low-level machine feedback 116 can include data associated with a current RPM of the machinery 106. For example, when the machinery 106 includes a coolant pump, the low-level machine feedback 116 can include data associated with a current flow rate of coolant at the machinery 106.

The controller computing system 104 can receive the low-level machine feedback 116. The controller computing system 104 can process the low-level machine feedback 116 to generate high-level feedback 118. The high-level feedback 118 can be feedback that may be interpreted so as to be understandable by the user 112. The controller computing system 104 can provide the high-level feedback 118 to the computing system 102.

The computing system 102 can receive the high-level feedback 118. The computing system 102 can process the high-level feedback 118 and provide for display directly the high-level feedback 118 for the user 112 or other information derived from the high level feedback 118. For example, when the machinery 106 includes a turbine-based system, the high-level feedback 118 displayed to the user 112 can include the current RPM of the machinery 106. For example, when the machinery 106 includes a coolant pump, the high-level feedback 118 displayed to the user 112 can include the current flow rate of coolant at the machinery 106.

Figure 2:
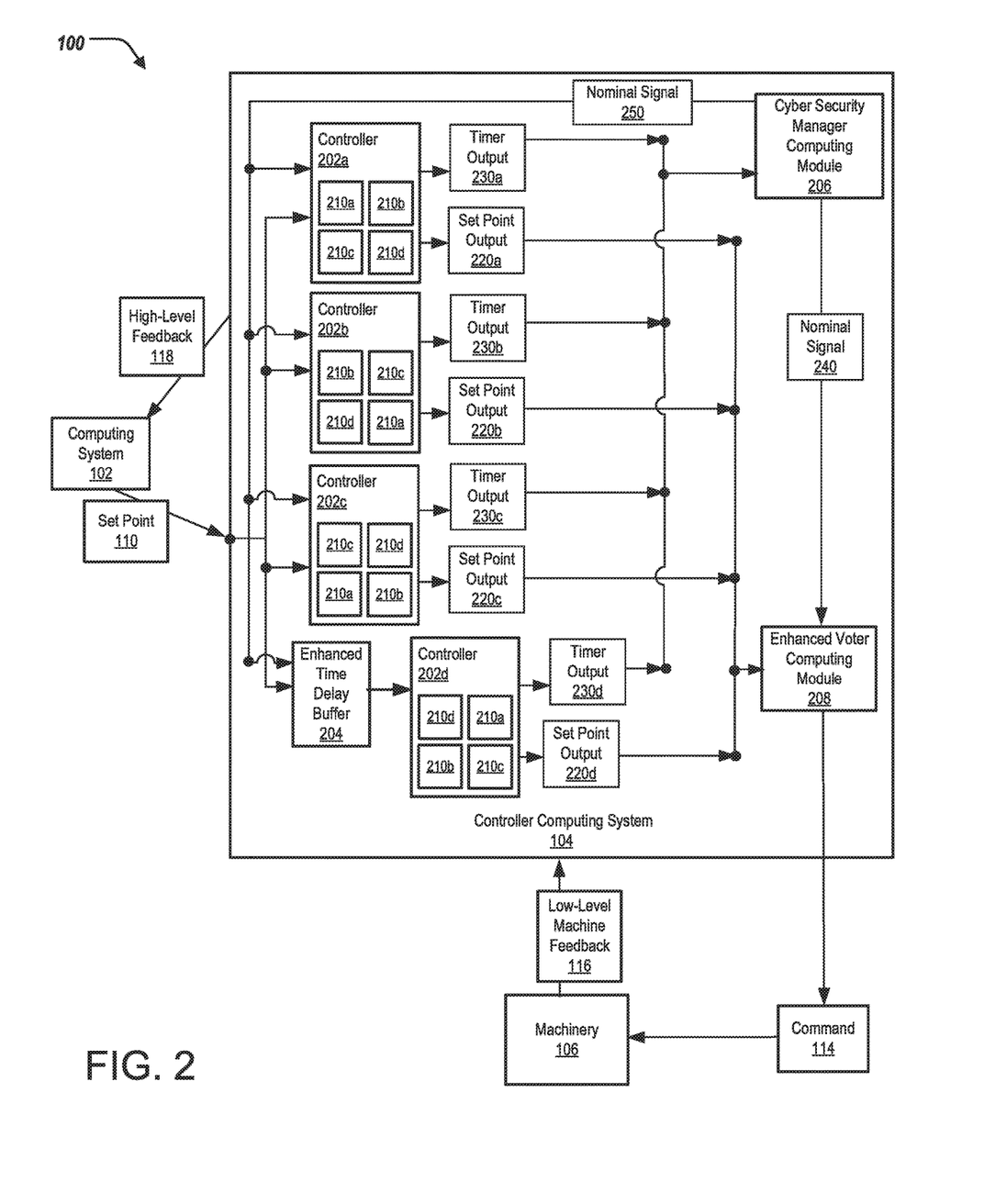
FIG. 2 is a block diagram of the computing environment of FIG. 1, including a detailed block diagram of the uncompromised controller computing system.

FIG. 2 illustrate a block diagram of the computing environment 100, including components of the controller computing system 104 are shown. The controller computing system 104 can include controllers 202a, 202b, 202c, 202d (collectively referred to as controller 202), an enhanced time delay buffer 204, a cyber security manager (CSM) computing module 206, and an enhanced voter computing module 208. The controllers 202 may be in communication with the CSM computing module 206 and the enhanced voter computing module 208. The enhanced time delay buffer 204 may be in communication with the controller 202d. The CSM computing module 206 is in communication with the enhanced voter computing module 208.

Each of the controllers 202 can include memory modules 210a, 210b, 210c, 210d (collectively referred to as memory modules 210). Further, as will be described herein, each of the controllers 202 can include a different memory diversification (different memory layout). That is, the logic of each of the controllers 202 is the same, with the logic of each controller 202 being mapped to the actual physical memory address space in a different order. For example, the controller 202a includes a first memory diversification; the controller 202a includes a second memory diversification; the controller 202a includes a third memory diversification; and the controller 202d includes a fourth memory diversification.

As will be described further herein, as a result of the different memory diversifications of each of the controllers 202, at most only one of the controllers 202 can be subjected to a malicious set point instruction provided by a malicious computing system for nefarious control of the machinery 106. That is, the memory diversification of at most one of the controllers 202 is responsive to the malicious set point instruction, described in further detail with respect to FIGS. 6-10.

The controllers 202a, 202b, 202c may receive the set point 110 from the computing system 102. Furthermore, the enhanced time delay buffer 204 can receive the set point 110 from the computing system 102. The enhanced time delay buffer 204 can delay for a period of time reception of the set point 110 by the controller 202d. That is, the controller 202d receives the set point 110 from the computing system 102 after a time delay provided by the enhanced time delay buffer 204—for example, the controller 202d can receive the set point 110 a period of time after reception of the set point by the controllers 202a, 202b, 202c. In this manner, the controller 202d is "sheltered" for the specified period of time. In some examples, the period of time delay is milliseconds or seconds.

Each of the controllers 202 can process the set point 110 to generate a respective output based on the set point 110. The output generated by the controllers 202 based on the set point 110 can include a command-based output for the machinery 106. For example, the controller 202a can calculate the set point output 220a based on the set point 110; the controller 202b can calculate the set point output 220b based on the set point 110; the controller 202c can calculate the set point output 220c based on the set point 110; and the controller 202d can calculate the set point output 220d based on the set point 110. As a result of the enhanced time delay buffer 204, the set point output 220d generated by the controller 202d can be delayed as compared to the set point outputs 220a, 220b, 220c (by the time period delay of the enhanced time delay buffer 204).

The set points outputs 220a, 220b, 220c, 220d can be referred to as set point outputs 220. Each of the set point outputs 220 can all be substantially the same. That is, each of the memory diversifications of the controllers 202 can provide identical functionality, and specifically, identical set point outputs 220.

In some examples, when the controllers 202 include diversified memories, the controllers 202 can generate the set point outputs 220 at differing times—that is, the controllers 202 can have processing time variances. The processing time variances can be a result of the diversified memories. For example, the controller 202a can generate the set point output 220a at a differing time than the controller 202b generating the set point output 220b. This may be the result of the controller 202a having a differing memory diversification as compared to the controller 202b.

Furthermore, when generating the set point outputs 220, the controllers 202 can further output a timer output. The controller 202 can generate the timer outputs at the end of every control loop iteration (i.e., when processing the set point 110 and generating the set point output 220). For example, the controller 202a can generate the timer output 230a; the controller 202b can generate the timer output 230b; the controller 202c can generate the timer output 230c; and the controller 202d can generate the timer output 230d. The timer outputs 230a, 230b, 230c, 230d are collectively referred to as timer outputs 230. In some examples, the controllers 202 generate the timer outputs 230 in response to generating the respective set point outputs 220.

In some examples, the controllers 202 generate the timer outputs 230 within a time threshold. The time threshold can be set prior to operation of the environment 100, and can further be based on the machinery 106. For example, the time threshold can be based on a responsiveness of the machinery 106 in performing an operation at the machinery 106 (e.g., in response to the set point 110). For example, the time threshold can be based on inertial, thermal, or flow continuum of the machinery 106 in performing an operation at the machinery 106 (e.g., in response to the set point 110). In some examples, the time threshold is 200 milliseconds. In another example, the time threshold can be based on when the set point 110 is transmitted or reception of the set point 110 by the controllers 202. In some examples, the controllers 202 generate the respective timer outputs 230 in response to generating the respective set point outputs 220 within the time threshold.

The CSM computing module 206 can receive the timer outputs 230 from each of the controllers 202. Specifically, when the CSM computing module 206 receives the timer outputs 230a, 230b, 230c, the CSM computing module 206 can output a nominal signal 240 for the enhanced voter computing module 208. That is, the CSM computing module 206, in response to receiving the timer outputs 230a, 230b, 230c, generates and outputs the nominal signal 240. The nominal signal 240 can indicate that "normal" operation of the controller computing system 104 is being performed, and that the set point 110 is not a malicious set point. For example, when the CSM computing module 206 receives the timer outputs 230a, 230b, 230c within a time threshold (e.g., 200 milliseconds), the CSM computing module 206, in response, can generate and output the nominal signal 240. Furthermore, the nominal signal 240 can indicate to the enhanced voter computing module 208 that "normal" operation of the controller computing system 104 is being performed, and that the set point 110 is not a malicious set point.

The enhanced voter computing module 208 can receive the set point outputs 220 from each of the controllers 202. Specifically, when the enhanced voter computing module 208 receives the nominal signal 240 from the CSM computing module 206, the enhanced voter computing module 208 identifies a majority from the set point outputs 220a, 220b, 220c. That is, the enhanced voter computing module 208 can compare the set point outputs 220a, 220b, 220c and determine which include the same value to identify the majority from the set point outputs 220a, 220b, 220c. For example, each of the set points outputs 220a, 220b, 220c can have substantially the same value, or have identical values. The enhanced voter computing module 208 can generate the command 114 (voter output) based on the identified majority of the set point outputs 220a, 220b, 220c.

Figure 3:
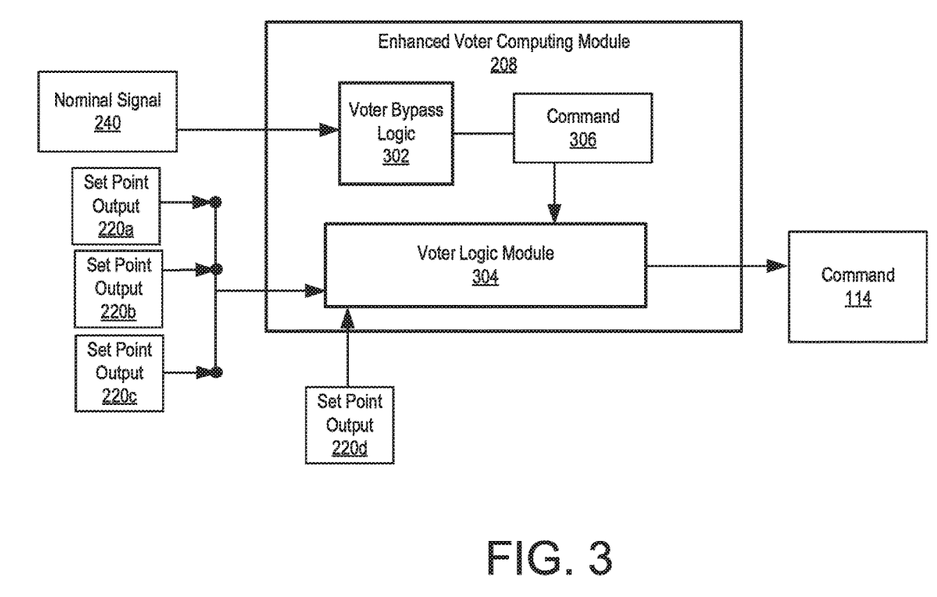
FIG. 3 illustrates a detailed block diagram of an enhanced voter computing module of the uncompromised controller computing system of FIG. 2.

FIG. 3 illustrates a block diagram of the enhanced voter computing module 208. The enhanced voter computing module 208 can include voter bypass logic 302 and a voter logic module 304. The voter bypass logic 302 can be in communication with the voter logic module 304. The voter bypass logic 302 can receive the nominal signal 240 from the CSM computing module 206 indicating that the controllers 202a, 202b, 202c have each provided the timer outputs 230a, 230b, 230c, respectively (i.e., the controller computing system 104 is operating under "normal" conditions and the set point 110 is a non-malicious set point). The voter bypass logic 302, in response to the nominal signal 240, can provide a command 306 to the voter logic module 304 to identify the majority of the set point outputs 220a, 220b, 220c. That is, the voter logic module 304 can compare the set point outputs 220a, 220b, 220c and determine which include the same value to identify the majority of the set point outputs 220a, 220b, 220c. The voter logic module 304 can generate the command 114 (voter output) based on the identified majority of the set point outputs 220a, 220b, 220c. For example, if controller 202a fails (e.g., a traditional failure such as hardware reliability issue or hardware failure at the controller 202a) and provides a faulty set point output 220a, the voter logic module 304 can ensure that the faulty set point output 220a is rejected, and generates the command 114 (voter output) based on the majority of the set points 220a, 220b, 220c (e.g., the set points 220b, 220c).

Referring back to FIG. 2, furthermore, when the CSM computing module 206 receives each of the timer outputs 230a, 230b, 230c, the CSM computing module 206 can output a nominal signal 250 for the controllers 202a, 202b, 202c, and the enhanced time delay buffer 204. For example, when the CSM computing module 206 receives each of the timer outputs 230a, 230b, 230c within a time threshold (e.g., 200 milliseconds), the CSM computing module 206 can output the nominal signal 250. The nominal signal 250 can indicate that "normal" operation of the controller computing system 104 is being performed, and that the set point 110 is not a malicious set point.

Figure 4:
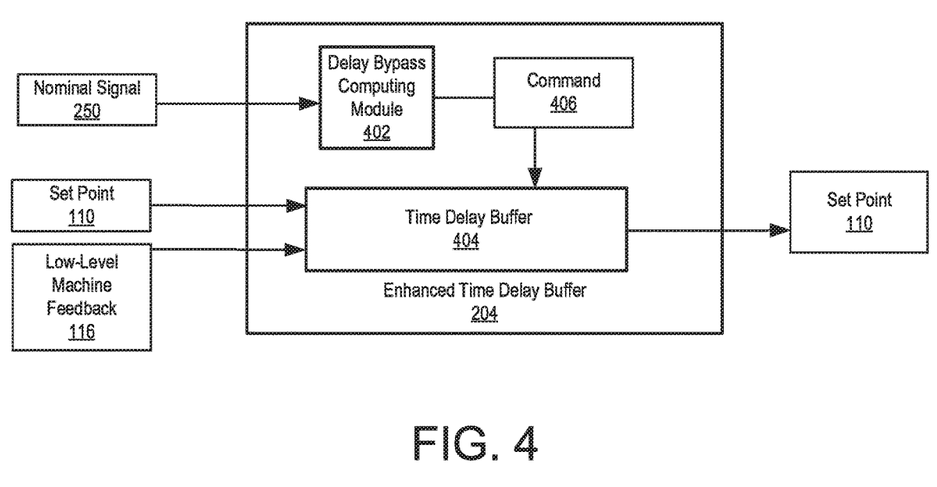
FIG. 4 illustrates a detailed block diagram of an enhanced time delay buffer of the uncompromised controller computing system of FIG. 2.

FIG. 4 illustrates a block diagram of the enhanced time delay buffer 204. The enhanced time delay buffer 204 can include a delay bypass computing module 402 and a time delay buffer 404. The delay bypass computing module 402 can be in communication with the time delay buffer 404. The delay bypass computing module 402 can receive the nominal signal 240 from the CSM computing module 206 indicating that each of the controllers 202a, 202b, 202c have each provided the timer output 230a, 230b, 230c, respectively (i.e., the controller computing system 104 is operating under "normal" conditions and the set point 110 is a non-malicious set point). The delay bypass computing module 402, in response to the nominal signal 250, can provide a command 406 to the time delay buffer 404 to forward the set point 110 to the controller 202d. Specifically, the time delay buffer 404, in response to the command 406, can forward the set point 110 to the controller 202d such that the controller 202d can process the set point 110 and generate the set point output 220d, as described above.

Figure 5:
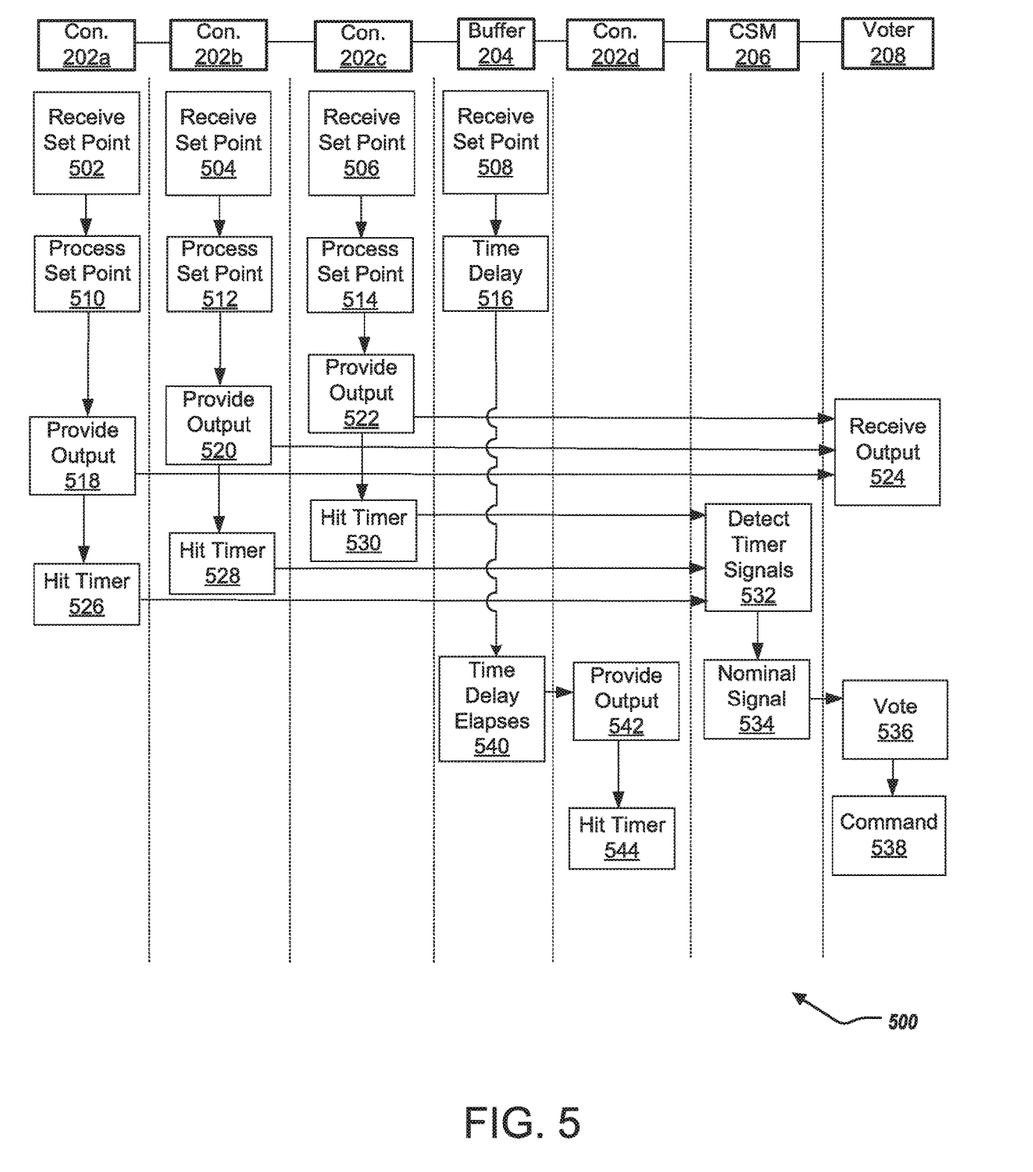
FIG. 5 illustrates a swim-lane diagram of operations of the computing environment of FIG. 2.

FIG. 5 illustrates a swim-lane diagram of a method 500 for operations of the computing environment 100 with respect to FIGS. 1-4. It is noted that certain operations described in method 500 may be optional or may be rearranged in different embodiments.

The controller 202a receives the set point 110, at 502. The controller 202b receives the set point 110, at 504. The controller 202c receives the set point 110, at 506. The enhanced time delay buffer 204 receives the set point 110, at 508. The steps 502, 504, 506, 508 can be performed at the same time, or substantially the same time. The controller 202a processes the set point 110, at 510. The controller 202b processes the set point 110, at 512. The controller 202c processes the set point 110, at 514. The steps 510, 512, and 514 can be performed at the same time, or substantially the same time. The enhanced time delay buffer 204 delays reception of the set point 110 to the controller 202d, at 516.

The controller 202a generates the set point output 220a, at 518. The controller 202b generates the set point output 220b, at 520. The controller 202c generates the set point output 220c, at 522. The steps 518, 520, and 522 can be performed at the same time, or substantially the same time. The enhanced voter computing module 208 can receive the set point outputs 220a, 220b, 220c from the controllers 202a, 202b, 202c, respectfully, at step 524.

The controller 202a can generate the timer output 230a, at 526. The controller 202b can generate the timer output 230b, at 528. The controller 202c can generate the timer output 230c, at 530. The steps 526, 528, 530 can be performed at the same time, or substantially the same time. The CSM computing module 206 receives the timer outputs 230a, 230b, 230c from the controllers 202a, 202b, 202c, respectfully, at step 532. The CSM computing module 206 generates the nominal signal 240 in response to receiving the timer outputs 230a, 230b, 230c, at 534. The enhanced voter computing module 208 receives the nominal signal 240 from the CSM computing module 206, and in response, identifies a majority from the set point outputs 220a, 220b, 220c, at step 536. The enhanced voter computing module 208 generates the command 114 based on the identified majority, at 538.

The time delay at the enhanced time delay buffer 204 elapses, at 540. The enhanced time delay buffer 204 forwards the set point 110 to the controller 202d, and the controller 202d generates the set point output 220d in response, at step 542. The controller 104d generates the timer output 230d, at step 544.

Figure 6:
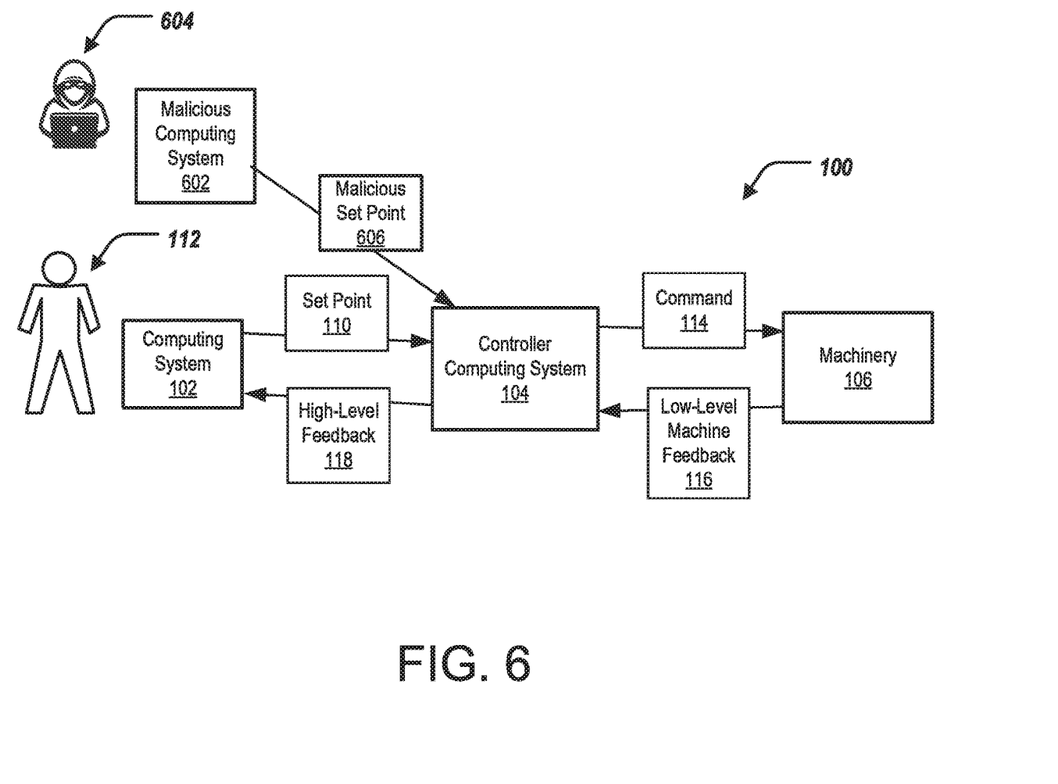
FIG. 6 is a high-level block diagram of a computing environment including a compromised controller computing system.

FIG. 6 illustrates the computing environment 100 when at attempt to overtake the computing environment 100 is detected. Specifically, a malicious computing system 602 (e.g., operated by a malicious entity 604) can attempt to overtake the machinery 106 by way of controlling the controller computing system 104. The malicious computing system 602 can provide a malicious set point instruction 606 to the controller computing system 104 in an attempt to gain control of the controller computing system 104, and ultimately, the machinery 106. The malicious set point instruction 606 (or malicious set point program 606) attempts to gain control of the controllers 202 to take over the control and operation of the machinery 106. The controller computing system 104 can detect and intercept the malicious set point instruction 606, as described further herein.

Figure 7:
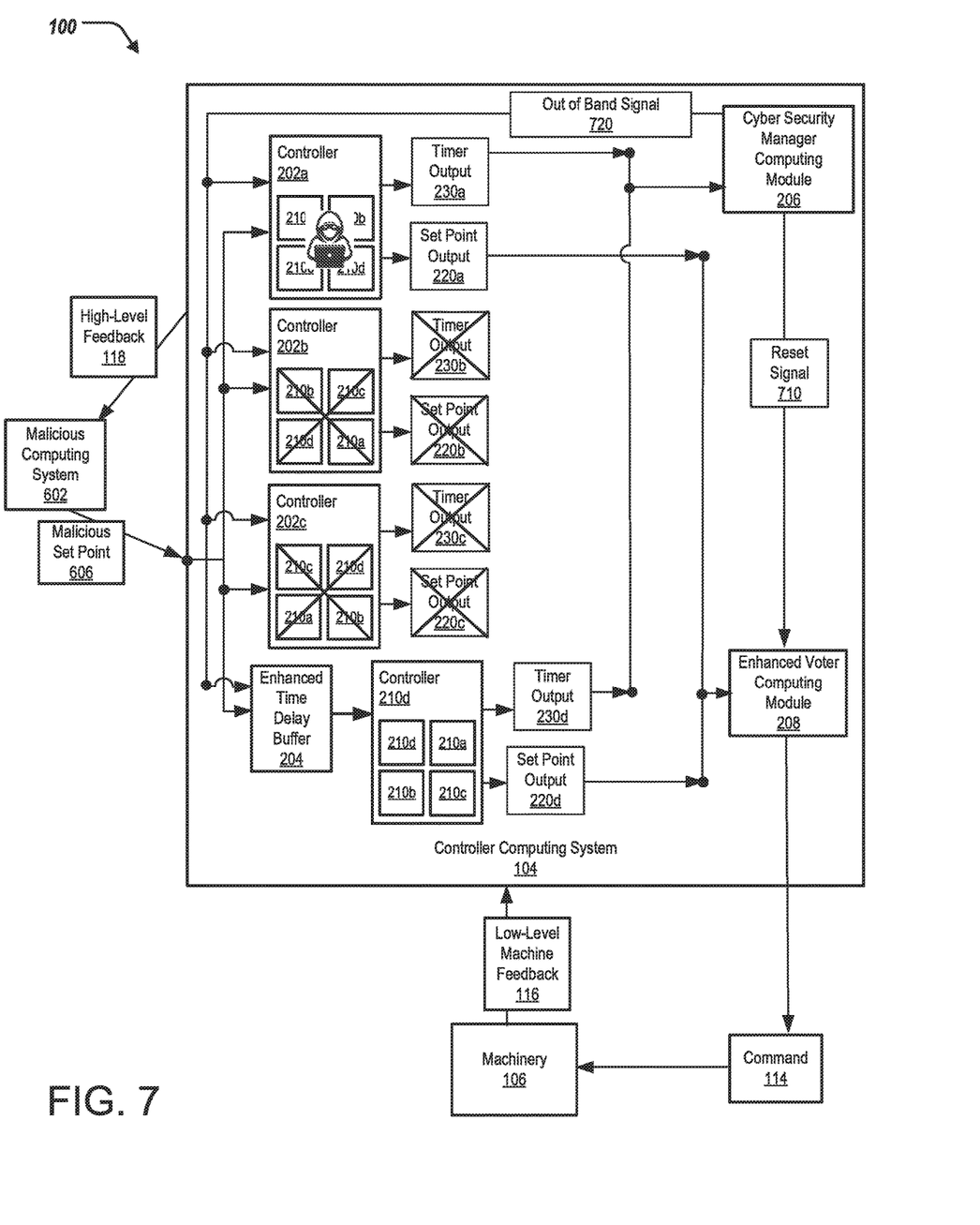
FIG. 7 is a block diagram of the computing environment of FIG. 6, including a detailed block diagram of the compromised controller computing system.

FIG. 7 illustrates a block diagram of the computing environment 100, including components of the controller computing system 104, when an attempt to take over the computing environment 100 is detected.

The controllers 202a, 202b, 202c may receive the malicious set point instruction 606 from the malicious computing system 602. Furthermore, the enhanced time delay buffer 204 can receive the malicious set point instruction 606 from the malicious computing system 602. The enhanced time delay buffer 204 can delay for a period of time reception of the malicious set point instruction 606 by the controller 202d. That is, the controller 202d is sheltered from receiving the malicious set point instruction 606 for a period of time (e.g., milliseconds or seconds).

The controllers 202a, 202b, 202c can process the malicious set point instruction 606. Specifically, the controller 202a can process the malicious set point instruction 606 to generate the set point output 220a. That is, the output generated by the controller 202a is based on the malicious set point instruction 606 and can include a command-based output for the machinery 106. In some examples, the controller 202a can be considered compromised by the malicious computing system 602 and acting on behalf of the malicious computing system 602.

The controllers 202b, 202c can also process the malicious set point instruction 606. When processing the malicious set point instruction 606, due to memory diversification, the controllers 202b, 202c will fail or crash, and thus fail to generate the set point outputs 220b, 220c, respectfully because the nefarious operating code will not execute properly due to it being effectively scrambled by the different memory organizations of controllers 202b and 202c. Specifically, as a result of the memory diversification of the controllers 202b, 202c as compared to the memory diversification at controller 202a, only the controller 202a is responsive to the malicious set point instruction 606 and the controllers 202b, 202c are not responsive to the malicious set point instruction 606. The memory diversifications at the controllers 202b, 202c are not responsive to the malicious set points instruction 606, and thus, fail at the controllers 202b, 202c, resulting in failed set point outputs 220b, 220c.

Furthermore, as a result of only controller 202a generating the set point output 220a and responsive to the malicious set point instruction 606, only the controller 202a outputs the timer output 230a. Specifically, when processing the malicious set point instruction 606, the controllers 202b, 202c fail, and thus fail to generate the timer outputs 230b, 230c, respectfully. Specifically, as a result of the memory diversification of the controllers 202b, 202c as compared to the memory diversification at controller 202a, only the controller 202a is responsive to the malicious set point instruction 606. The memory diversifications of the controllers 202b, 202c are not responsive to the malicious set points instruction 606, and thus, fail at the controllers 202b, 202c, resulting in failed timer outputs 230b, 230c. In some examples, the controllers 202b, 202c fail to output timer outputs 230b, 230c within a time period (e.g., 200 milliseconds).

In some examples, the timer outputs 230 can fail when the respective controller 202 faults during execution of the malicious set point instruction 606 ("underflow") or when the execution is stuck in an infinite loop ("overflow"). For example, the controllers 202b, 202c can experience the underflow or overflow conditions in response to the malicious set point instruction 606, resulting in failing to generate the timer outputs 230b, 230c, respectively.

Additionally, as the controller 202d is sheltered from the malicious set point instruction 606 by the enhanced time delay buffer 204, the controller 202d can store a set point output that is responsive to a previous set point (e.g., the set point 110). Specifically, the controller 202d can include a queue, such as a first in/first out (FIFO) queue. The FIFO queue of the controller 202d can store the set point output that is responsive to the previous set point that is non-malicious, described further below.

In cases of an attack, the CSM computing module 206 may receive only the timer output 230a from the controller 202a. Specifically, when the CSM computing module 206 only receives the timer output 230a, the CSM computing module 206 can output a reset signal 710 for the enhanced voter computing module 208. The reset signal 710 can indicate that the controller computing system 104 is compromised, and is being responsive to the malicious set point instruction 606. In other words, when the CSM computing module 206 does not receive each of the timer outputs 230a, 230b, 230c (e.g., the CSM computing module 206 monitors the timer outputs 230a, 230b, 230c) within a time threshold (e.g., 200 milliseconds), the CSM computing module 206 can determine that the malicious set point instruction 606 has been provided, and generates the reset signal 710 for the enhanced voter computing module 208.

The enhanced voter computing module 208 can receive the set point outputs 220a, 220d from the controllers 202a, 202d, respectively. The set point output 220a is the output from the controller 202a based on processing the malicious set point instruction 606, and thus, is a malicious output. The set point output 220d is the output from the sheltered controller 202d, and is based on a previous non-malicious set point (e.g., set point 110). Thus, the set point output 220d is a valid output that is stored by a FIFO queue of the controller 202d. When the enhanced voter computing module 208 receives the reset signal 710 from the CSM computing module 206, the enhanced voter computing module 208 generates the command 114 based on the set point output 220d.

Figure 8:
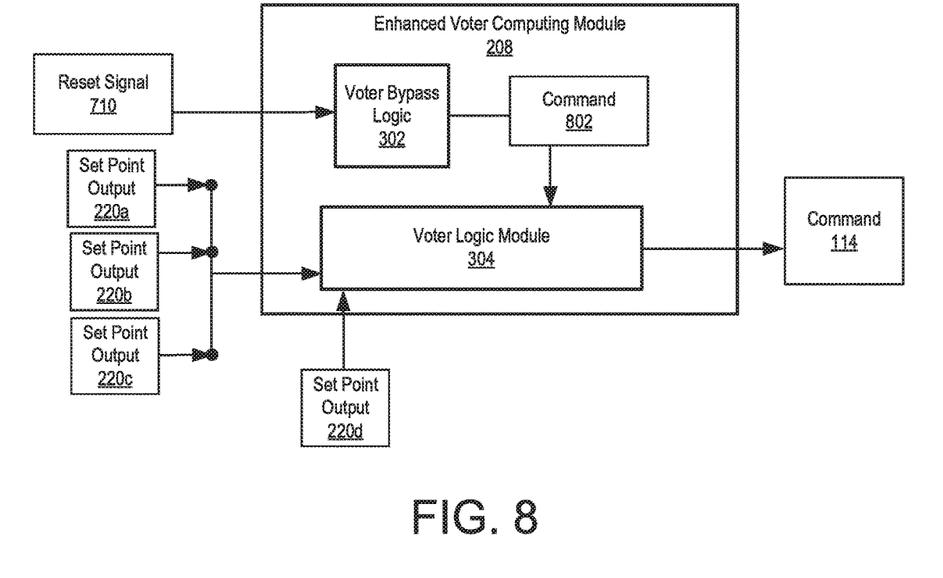
FIG. 8 illustrates a detailed block diagram of an enhanced voter computing module of the uncompromised controller computing system of FIG. 7.

FIG. 8 illustrates a block diagram of the enhanced voter computing module 208, when an attempt to overtake the computing environment 100 is detected. Specifically, the voter bypass logic 302 can receive the reset signal 710 from the CSM computing module 206 indicating that only the timer output 230a from the controller 202a has been received (i.e., the controller computing system 104 is compromised, and the set point is a malicious set point). The voter bypass logic 302, in response to the reset signal 710, can provide a command 802 to the voter logic module 304 to select the set point output 220d from the sheltered controller 202d. The voter logic module 304 can generate the command 114 (voter output) based on the set point output 220d.

Referring back to FIG. 7, furthermore, when the CSM computing module 206 receives only the timer output 230a from the controller 202a, the CSM computing module 206 can output an out of band signal 720 for the controllers 202a, 202b, 202c, and the enhanced time delay buffer 204. The out of band signal 720 can indicate that the controller computing system 104 is compromised, and being responsive to a malicious set point. In other words, when the CSM computing module 206 does not receive each of the timer outputs 230a, 230b, 230c (e.g., the CSM computing module 206 monitors the timer outputs 230a, 230b, 230c) within a time threshold (e.g., 200 milliseconds), the CSM computing module 206 can determine that a malicious set point has occurred, and generates the out of band signal 720 for the enhanced voter computing module 208.

Figure 9:
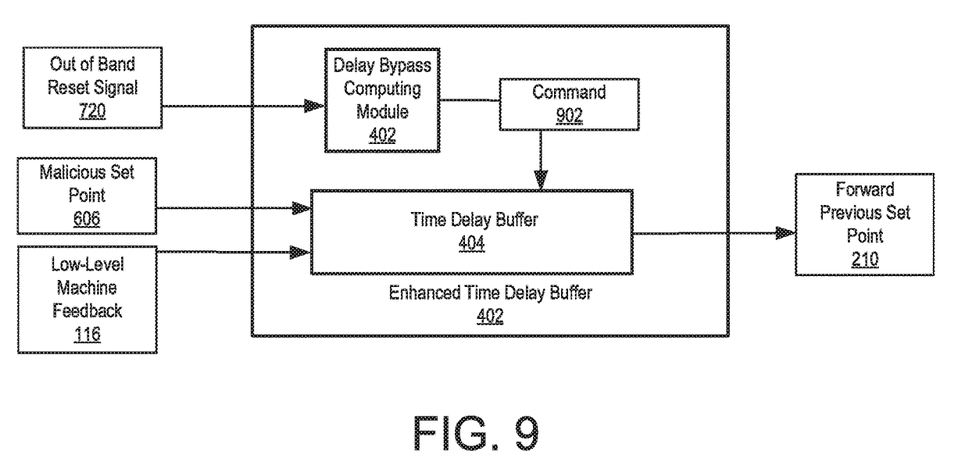
FIG. 9 illustrates a detailed block diagram of an enhanced time delay buffer of the uncompromised controller computing system of FIG. 7.

FIG. 9 illustrates a block diagram of the enhanced time delay buffer 204, when an attempt to take over the computing environment 100 is detected. The delay bypass computing module 402 can receive the out of band signal 720 from the CSM computing module 206 indicating that only the timer output 230a from the controller 202a has been received (i.e., the controller computing system 104 is compromised, and the set point is a malicious set point). The delay bypass computing module 402, in response to the out of band signal 720, can provide a command 902 to the time delay buffer 404 to drop a time delay of the time delay buffer 404 at the controller 202d. As a result, the controller 202d can output the previous set point output based on the previous non-malicious set point (as stored in the FIFO at the controller 202d) to the enhanced voter computing module 208.

Referring back to FIG. 7, the controllers 202a, 202b, 202c can receive the out of band signal 720. When the controllers 202a, 202b, 202c receive the out of band signal 720, one or more or all of the controllers 202a, 202b, 202c can restart (or be reset). For example, a controller 202 is restarted (or reset) by obtaining a previous version of computer-executable code that is executed by the controller 202. When one or more of the controllers 202a, 202b, 202c are restarted (or reset), the respective controller is cleared from generating malicious output on behalf of the malicious computing system 602 based on the malicious set point instruction 606. That is, the respective controller is able to generate a valid set point output based on a newly received set point from the computing system 102.

For example, only the controller 202a generating the timer output 230a is indicative of the controller 202a being considered compromised by the malicious computing system 602 and acting on behalf of the malicious computing system 602. To that end, when the CSM computing module 206 receives only the timer output 230a from the controller 202a, the CSM computing module 206 outputs the out of band signal 720 to command the controller 202a to restart (or reset). However, in some examples, when the CSM computing module 206 only receives the timer output 230a from the controller 202a, the CSM computing module 206 outputs the out of band signal 720 to command each of the controllers 202a, 202b, 202c to restart (or reset).

Referring back to FIG. 2 in some cases, when one or more of the controllers 202a, 202b, 202c fail to generate a respective timer outputs 230a, 230b, 230c for the CSM computing module 206, a race condition can occur at one of the controllers 202a, 202b, 202c. Specifically, as mentioned prior, the controllers 202 can have differing execution times based on the set point 110 as a result of the memory diversification of the controllers 202. This may result in race conditions where one of the controllers 202a, 202b, 202c can fail to generate a respective timer output 230a, 230b, 230c within the time threshold (e.g., 200 milliseconds) based on the valid, non-malicious set point 110. However, the CSM computing module 206 generates the reset signal 710 and the out of band signal 720 whether the controllers 202a, 202b, 202c fail to generate the respective timer output 230a, 230b, 230c based on the race condition or based on the malicious set point instruction 606. For example, one of the controllers 202a, 202b, 202c failing to generate a respective timer output 230a, 230b, 230c can be indicative of a race condition at the controllers 202a, 202b, 202c. For example, when the CSM computing module 206 only receives the timer outputs 230a, 230b from controllers 202a, 202b, respectively, the CSM computing module 206 generates the out of band signal 720 to command only the controller 202c to restart (or reset).

Figure 10:
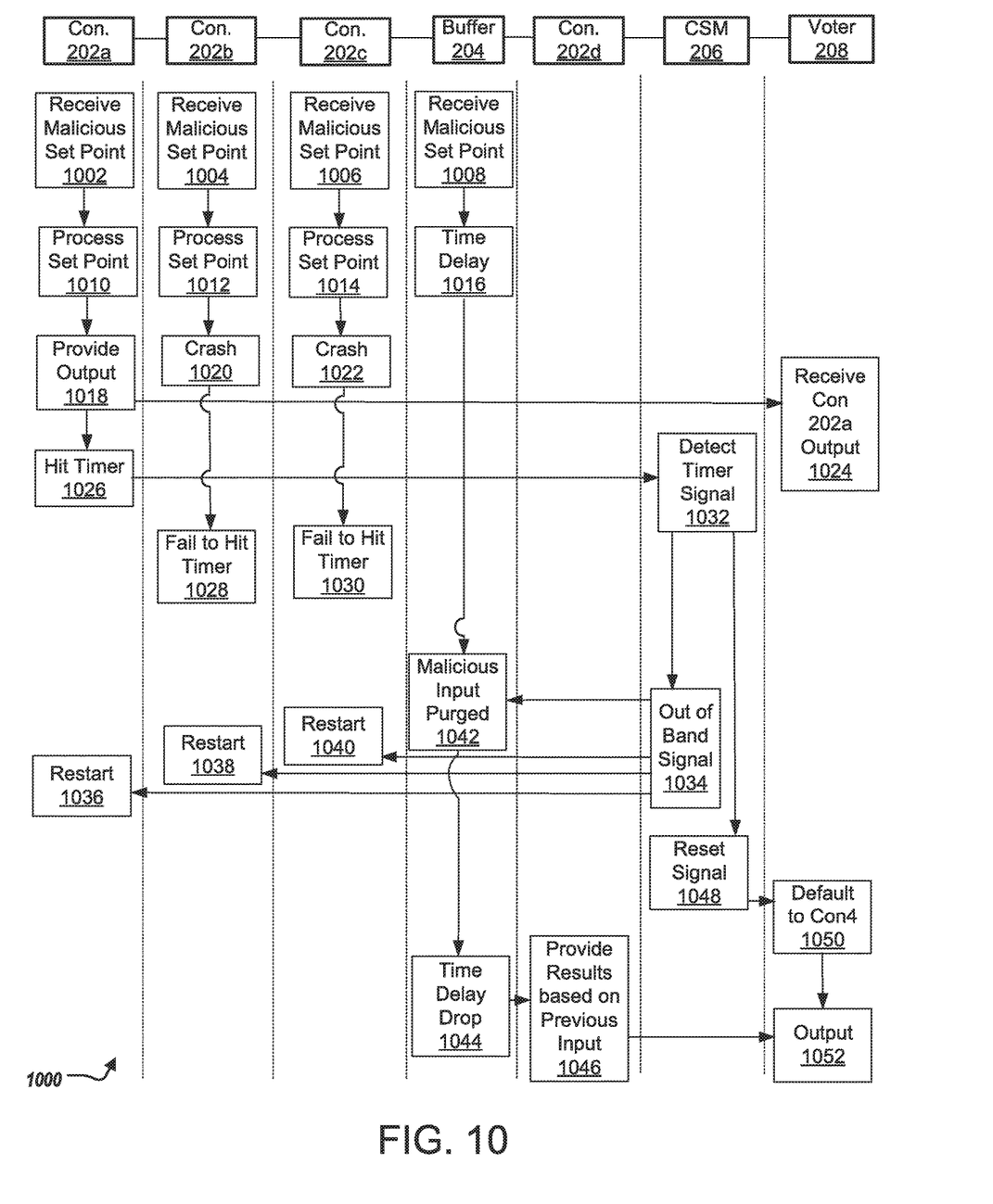
FIG. 10 illustrates a swim-lane diagram of operations of the computing environment of FIG. 7.

FIG. 10 illustrates a swim-lane diagram of a method 1000 for operations of the computing environment 100 with respect to FIGS. 6-9. It is noted that certain operations described in method 1000 may be optional or may be rearranged in different embodiments.

The controller 202a receives the malicious set point instruction 606, at 1002. The controller 202b receives the malicious set point instruction 606, at 1004. The controller 202c receives the malicious set point instruction 606, at 1006. The enhanced time delay buffer 204 receives the malicious set point instruction 606, at 1008. The steps 1002, 1004, 1006, 1008 can be performed at the same time, or substantially the same time. The controller 202a processes the malicious set point instruction 606, at 1010. The controller 202b processes the malicious set point instruction 606, at 1012. The controller 202c processes the malicious set point instruction 606, at 1014. The steps 1010, 1012, and 1014 can be performed at the same time, or substantially the same time. The enhanced time delay buffer 204 delays reception of the malicious set point instruction 606 to the controller 202d, at 1016.

The controller 202a generates the set point output 220a, at 1018. The controller 202b, because of memory diversification, fails to generate the set point output 220b (crashes), at 1020. The controller 202c, because of memory diversification, fails to generate the set point output 220c (crashes), at 1022. The steps 1018, 1020, and 1022 can be performed at the same time, or substantially the same time. The enhanced voter computing module 208 can receive only the set point output 220a from the controller 202a, at step 1024.

The controller 202a can generate the timer output 230a, at 1026. The controller 202b fails generate the timer output 230b, at 1028. The controller 202c fails to generate the timer output 230c, at 1030. The CSM computing module 206 receives only the timer output 230a from the controller 202a, at step 1032. The CSM computing module 206, in response to only receiving the timer output 230a, generates the out of band signal 720, at 1034. The controller 202a receives the out of band signal 720, and restarts, at 1036. The controller 202b receives the out of band signal 720, and restarts, at 1038. The controller 202c receives the out of band signal 720, and restarts, at 1040. The enhanced time delay buffer 204 receives the out of band signal 720, and purges the malicious set point instruction 606 from memory, at 1042. The enhanced time delay buffer 204 drops the time delay, at 1044. The enhanced time delay buffer 204 instructs the sheltered controller 202d to provide the set point output 220d based on the previous, non-malicious set point, at 1046.

Further, the CSM computing module 206, in response to only receiving the timer output 230a, generates the reset signal 710, at 1048. The enhanced voter computing module 208 receives the reset signal 710, and defaults to the set point output 230d from the sheltered controller 202d, at 1050. The enhanced voter computing module 208 generates output (the command 114) based on the set point output 220d, at 1052.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A controller computing system, including:
  a first controller configured to i) calculate a first output based on a current set point and ii) output a first timer signal;
  a second controller configured to i) calculate a second output based on the current set point and ii) output a second timer signal;
  a third controller configured to i) calculate a third output based on the current set point and ii) output a third timer signal;
  a fourth controller configured to i) calculate a fourth output based on a previous set point and ii) output a fourth timer signal;
  an enhanced time delay buffer configured to delay reception of the current set point by the fourth controller;
  a cyber security manager (CSM) computing module configured to:
    when each of the first timer signal, the second timer signal, and the third timer signal are received, output a nominal signal; and
    when two or less of the first timer signal, the second timer signal, and the third timer signal are received, output a reset signal;
  an enhanced voter computing module configured to:
    when the nominal signal is received from the CSM computing module, i) identify a majority based on the first output, the second output, and the third output, and ii) generate a voter output based on the identified majority; and
    when the reset signal is received from the CSM computing module, generate the voter output based on the fourth output.

2. The controller computing system of claim 1, wherein the CSM computing module is further configured to, when two or less of the first timer signal, the second timer signal, and the third timer signal are received, output an out of band signal, wherein the enhanced time delay buffer is further configured to receive the out of band signal, and in response, drop a time delay of the fourth controller such that the fourth controller outputs the fourth output to the enhanced voter computing module.

3. The controller computing system of claim 2, wherein each of the first controller, the second controller, and the third controller are further configured to receive the out of band signal, and in response, restart one or more of the first controller, the second controller, and the third controller.

4. The controller computing system of claim 3, wherein when the CSM computing module receives only the first and the second timer signal, the CSM computing module is configured to output the out of band signal to command the third controller to restart.

5. The controller computing system of claim 3, wherein when the CSM computing module receives only the first timer signal, the CSM computing module is configured to output the out of band signal to command the first controller to restart.

6. The controller computing system of claim 2, wherein the fourth controller stores the fourth output in a queue, and provides the fourth output in response to the drop time delay signal from the enhanced time delay buffer.

7. The controller computing system of claim 1, wherein the first controller includes a first memory diversification, the second controller includes a second memory diversification, the third controller includes a third memory diversification, and the fourth controller includes a fourth memory diversification, wherein each of the first memory diversification, the second memory diversification, the third memory diversification, and the fourth memory diversification are different.

8. The controller computing system of claim 7, wherein, when the CSM computing module outputs the nominal signal, the first output, the second output, and the third output are all substantially the same.

9. The controller computing system of claim 1, wherein the first controller generates the first timer signal i) in response to generating the first output and ii) within a time threshold.

10. A controller computing system, including:
a plurality of controllers, each controller configured to i) calculate a respective output based on a current set point and ii) output a timer signal;
an additional controller configured to i) calculate an additional output based on a previous set point and ii) output an additional timer signal;
a cyber security manager (CSM) computing module configured to:
output a nominal signal indicating that the current set point is a non-malicious set point when the CSM computing module receives each of the timer signals from each of the plurality of controllers, and the additional output from the additional controller; and
output a reset signal indicating that the current set point is a malicious set point when the CSM computing module receives less than each of the timer signals from the plurality of controllers;
an enhanced voter computing module configured to:
when the nominal signal is received from the CSM computing module, i) identify a majority based on each of the outputs of the respective controllers and the additional output of the additional controller, and ii) generate a voter output based on the identified majority, and
when the reset signal is received from the CSM computing module, generate the voter output based on the additional output.

11. The controller computing system of claim 10, wherein the CSM computing module is further configured to, when each of the timer signals is not received from each of the plurality of controllers, output an out of band signal.

12. The controller computing system of claim 11, wherein each of the plurality of controllers are further configured to receive the out of band signal, and in response, restart one or more of each of the plurality of controllers.

13. The controller computing system of claim 10, wherein a memory diversification of each of the plurality of controllers is substantially different.

14. A controller computing system, including:
a first controller configured to calculate a first output based on a current set point;
a second controller configured to calculate a second output based on the current set point;
a third controller configured to calculate a third output based on the current set point;
a fourth controller configured to calculate a fourth output based on a previous set point;
an enhanced time delay buffer configured to delay reception of the current set point by the fourth controller;
an enhanced voter computing module configured to:
when a nominal set point is detected i) identify a majority based on the first output, the second output, and the third output, and ii) generate a voter output based on the identified majority; and
when a malicious set point is detected, generate the voter output based on the fourth output.

15. The controller computing system of claim 14, the enhanced time delay buffer further configured to receive an out of band signal and in response, drop a time delay of the fourth controller such that the fourth controller outputs the fourth output to the enhanced voter computing module.

16. The controller computing system of claim 15, wherein each of the first controller, the second controller, and the third controller are further configured to receive the out of band signal, and in response, restart one or more of the first controller, the second controller, and the third controller.

17. The controller computing system of claim 15, wherein the fourth controller stores the fourth output in a queue, and provides the fourth output in response to the drop time delay signal from the enhanced time delay buffer.

18. The controller computing system of claim 14, wherein the first controller includes a first memory diversification, the second controller includes a second memory diversification, the third controller includes a third memory diversification, and the fourth controller includes a fourth memory diversification, wherein each of the first memory diversification, the second memory diversification, the third memory diversification, and the fourth memory diversification are different.

19. The controller computing system of claim 18, wherein the first output, the second output, and the third output are all substantially the same.

* * * * *